United States Patent [19]

Malloy

[11] 4,201,307
[45] May 6, 1980

[54] OIL COLLECTION RECEPTACLE

[76] Inventor: Frank H. Malloy, 19 Bragaw St., New London, Conn. 06320

[21] Appl. No.: 23,305

[22] Filed: Mar. 23, 1979

[51] Int. Cl.² .......................... B65D 25/00; B65D 5/24
[52] U.S. Cl. .................................. 220/62; 229/31 R; 220/1 C
[58] Field of Search ................ 220/62, 1 C, 85 K, 73, 220/72; 229/31 R, 49

[56] References Cited

U.S. PATENT DOCUMENTS

| 922,334 | 5/1909 | Regenstein | 229/31 R |
|---|---|---|---|
| 1,653,465 | 12/1927 | Montan et al. | 229/31 R |
| 2,986,235 | 5/1961 | Weibert, Jr. | 180/69.1 X |
| 3,140,037 | 7/1964 | Baum et al. | 229/31 R X |
| 3,335,935 | 8/1967 | McCallum | 229/31 R |
| 3,651,884 | 3/1972 | Dorries | 220/1 C X |
| 3,760,465 | 9/1973 | Brennan | 229/49 X |
| 4,014,450 | 3/1977 | Girotti et al. | 220/72 X |

Primary Examiner—Steven M. Pollard
Attorney, Agent, or Firm—Albert W. Hilburger

[57] ABSTRACT

A receptacle for collecting oil drippings from the underside of an inboard engine of a boat. A rectangular sheet of semirigid plastic material has a plurality of hinge lines formed by scoring to provide an integral receptacle defined by a base, sidewalls, and corner members. The sidewalls and corner members are folded flat against the base for insertion beneath the engine. When fully inserted the sidewalls are erected to a substantially vertical position. Retention members are employed adjacent the corners of the receptacle for maintaining the sidewalls in their erected positions and for holding the corner members in place against the outer surface of a respective sidewall. With the receptacle in position, straps integral with the sidewalls are attached to the engine supporting structure for suspension of the receptacle beneath the engine.

2 Claims, 19 Drawing Figures

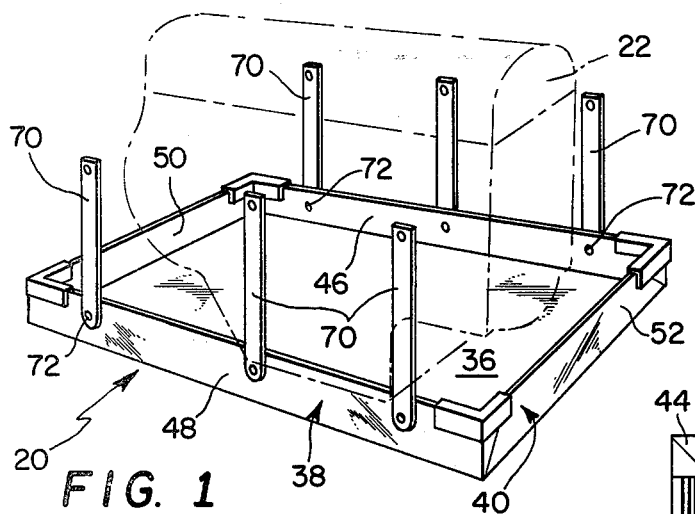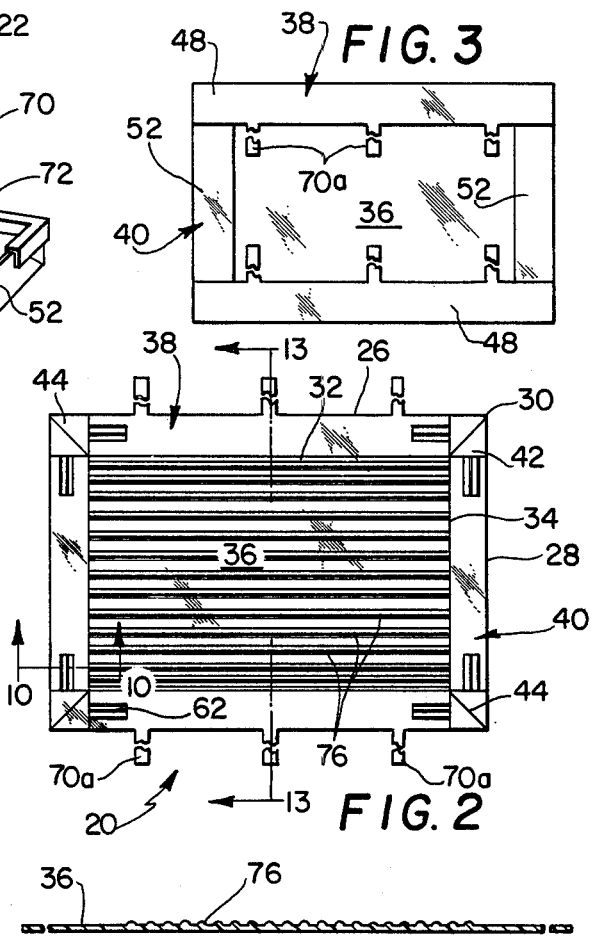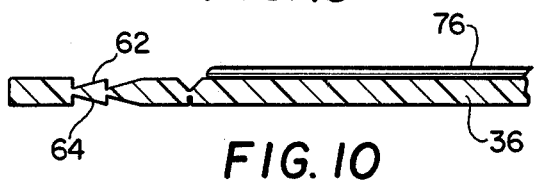

OIL COLLECTION RECEPTACLE

BACKGROUND OF THE INVENTION

1. Field of Invention

This invention relates generally to improved receptacles for collecting oil and other liquids which drip from the underside of engines and to their method of manufacture and deployment particularly in boats equipped with inboard engines.

2. Description of the Prior Art

In recent years, it has become more and more apparent that our natural resources are not as plentiful as they were once believed to be. Indeed, it has come to be realized that unless positive steps are taken to conserve our natural resources and to preserve the beauty of our land and seas, future generations will not experience the features of the world which present generations take for granted. The present invention results from the inventor's sincere desire to achieve such conservation and, specifically, in relation to our inland and coastal waterways.

This concern for our natural resources is not a new one, but it has received added emphasis in recent years. Hence, there have been prior attempts to provide solutions for the problems to which the present invention relates. Typical of the solutions known to the inventor are those disclosed in U.S. Patents to McCord, No. 3,785,451; to Robel et al, No. 3,661,227; and to Tribuzi, No. 3,333,652.

The McCord patent, for example, discloses an automobile diaper which is secured in position under those portions of an automobile subject to dripping oil. It is rectangular in shape and comprises a double layer envelope which contains a mass of absorbent material. The diaper lies in substantially a single plane, has no sidewalls, and must be disposed of when it becomes fully saturated with oil. Because of its highly flexible construction, the McCord diaper is intended for use under specific automotive devices and not under the entire engine.

The Robel et al patent discloses a drainage collection container for placement on the floor of a garage. It is adapted to be driven over by a vehicle and the sides of the container have substantial thickness described as being composed of foamed plastic or other resilient material capable of being deformed or crushed by vehicle tires passing over it but having a memory to return to its normal cross section when released. As described, the outer dimensions of the container are greater than the outer dimensions of a vehicle with which it is to be used.

The patent to Tribuzi discloses an oil catching apron for placement under a vehicle engine and transmission including a flexible foundation sheet provided on its upper surface with an absorbent pad positioned to absorb dripping oil. The foundation sheet is provided with elastic cords for suspending it from suitable portions of the vehicle's structure. Presumably, the absorbent pad is removed and replaced when it becomes saturated.

Also known to the inventor are patents which do not relate to devices for the collection of dripping oil from the underside of a motor vehicle, but which should be considered in connection with the patentability of the present invention. Typical patents of interest are those to Conescu, U.S. Pat. No. 2,414,854, and to Van Wormer, U.S. Pat. No. 1,548,494. Both of these patents relate to folding boxes and include interlocking flap constructions which enable a user to rapidly set up a box in a three dimensional construction from a two dimensional blank.

In some instances, the prior art disclosed complex oil collection devices which were expensive to manufacture and maintain and which were not readily applicable to existing boats in which the inboard engines were already in place.

SUMMARY OF THE INVENTION

It was with recognition of the need and of the state of the prior art that the present invention was conceived. To this end, the present invention discloses a receptacle for collecting oil drippings from the underside of an inboard engine of a boat, particularly for an existing boat, in which an engine is presently mounted. A rectangular sheet of semirigid plastic material is provided with a plurality of hinge lines formed by scoring to provide an integral receptacle defined by a base, sidewalls, and corner members. The sidewalls and corner members are folded flat against the base for insertion beneath the engine. When fully inserted, the sidewalls are erected to a substantially vertical position. Retention members are employed adjacent the corners of the receptacle for maintaining the sidewalls in their erected positions and for holding the corner members in place against the outer surface of a respective sidewall. With a receptacle in position, straps integral with the sidewalls are attached to the boat structure for suspension of the receptacle beneath the engine.

In one construction, the retention members may be separate from the sidewalls, taking the form of fasteners having first and second legs connected by a bight. The first and second legs are preferably biased toward one another such that when they are applied to the receptacle with the sidewalls in their erected positions and with the corner members in place against the outer surface of their respective sidewalls, one leg engages the inner surface of the respective sidewall and the other leg holds the corner member in place against the outer surface of the sidewall. It may be desireable to form the sidewalls with a roughened surface or with ridges with similar formations on the legs for positive engagement, one with the other.

In an alternative construction, the retention members are integral with the sidewalls, each such member extending upwardly from an upper edge of its associated sidewall when the sidewall is in its erected position, then curving back onto itself into a direction generally toward the base, the retention member being biased against the outer surface of its associated sidewall so as to hold its associated corner member in place between it and the outer surface of the sidewall. Of course, to achieve this end, each retention member must be located so as to be contiguous with an associated corner member when the latter assumes a position in place against the outer surface of a respective sidewall.

Still another alternative construction for the retention member is in the form of a fastener having male and female elements. Specifically, the male element consists of a head engageable with an outer surface of an associated corner member when positioned in place against the outer surface of a respective sidewall and an integral shank which pierces the corner member and the sidewall and extends beyond the inner surface of its respective sidewall. The female element, having an aperture, is fittingly received over the end of the shank and is thereby held firmly in place against the inner surface of its respective sidewall.

As compared with many of the patents known to the prior art, the present invention is of simplified construction and utilizes a minimum number of parts in its construction. Furthermore, the invention utilizes existing materials and components. Particularly important is the ability of the invention to be applied to existing boats with inboard engines already in place.

Furthermore, the invention is inexpensive to manufacture and requires minimal maintenance. Also, it is preferably constructed of noncorrosible materials, is compact for shipping and storage prior to use, and can be readily assembled and disassembled. The resulting device incorporating all of these features is a receptacle which would substantially eliminate pollution on our inland and coastal waterways and, simultaneously, save for further use, substantial quantities of oil which would otherwise be wasted.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate one embodiment of the invention, and together with the description, serve to explain the principles of the invention.

BRIEF DESCRIPTION OF THE DRAWINGS

In the drawings:

FIG. 1 is a perspective view illustrating the invention in place beneath an inboard engine of a boat, the engine being shown in phantom;

FIG. 2 is a top plan view of the invention with all of its elements lying substantially within a single plane;

FIG. 3 is a top plan view of the invention in its folded condition, ready for insertion beneath an inboard engine;

FIG. 4 is a detail perspective view showing a portion of the invention illustrated in FIG. 2;

FIG. 5 is a detail perspective view, similar to FIG. 4, illustrating an intermediate step in the process of erecting the invention for use;

FIG. 6 is a perspective view similar to FIGS. 4 and 5 illustrating a further intermediate step in erecting the invention for use;

FIG. 10 is a cross section view taken generally along line 10—10 in FIG. 2;

FIG. 11 is a side elevation view illustrating an inboard engine and portions of the boat structure, in phantom, with the invention in the process of being inserted beneath the engine;

FIG. 12 is a side elevation view, similar to FIG. 11, illustrating the invention in place and ready for use;

FIG. 13 is a cross section view taken generally along line 13—13 in FIG. 2;

DESCRIPTION OF THE PREFERRED EMBODIMENTS

Figure 7:
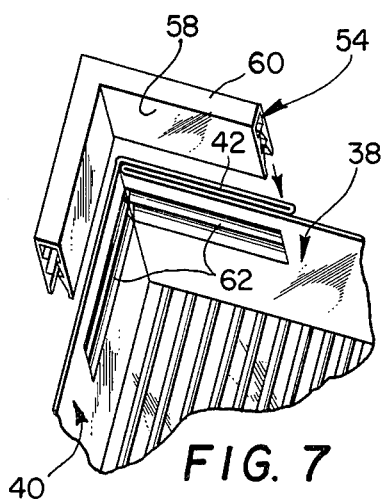
FIG. 7 is a perspective view of the invention similar to FIGS. 4-6 illustrating still a further intermediate step in the process of erecting the invention for use.

Refer now to the drawings and initially to FIG. 1 which is generally illustrative of the invention. In FIG. 1, a receptacle 20 is illustrated in its operative position beneath an engine 22 (shown in phantom) which may be an inboard powerplant for a small or medium sized boat. The receptacle 20 serves to collect waste material which may be in the form of oil and other liquids which drip from the underside of an engine. Witout a device such as the receptacle 20, the oil would drip into the bilge of the boat and eventually be pumped or otherwise discharged into the surrounding water with resultant pollution. In contrast, the receptacle 20 serves to collect such waste materials enabling them to be disposed of in some proper fashion at a later time with no adverse effect on the environment.

In accordance with the invention, the receptacle 20 comprises a sheet of semirigid plastic material in the form of a polygon having a plurality of outer edges defining its perimeter and a plurality of corners defining the limits of said outer edges, said sheet lying in a substantially flat plane, said sheet being impervious to the passage of liquids.

As embodied herein, and with particular reference initially to FIGS. 1 and 2, the receptacle 20 is formed from a sheet 24 of semirigid plastic material in the form of a polygon. In actual use, a rectangular form would be preferred, but the scope of the invention should not be restricted by the use of other possible shapes. Similarly, use of the term "plastic material" should not restrict the invention to organic synthetic or processed materials, but it may also refer to a variety of other materials, including metals which have some degree of ductility and malleability. The shape of the sheet 24 is defined by its outer edges 26 and 28 and the limits of the outer edges are defined by corners 30. It will be appreciated that the sheet 24 lies in a substantially flat plane and that the sheet is composed of an appropriate material and is of a construction so as to be liquid tight.

In accordance with the invention, first lines are formed in said sheet extending from one of said edges to another of said edges at a substantially constant distance inboard from each edge of said sheet, those portions of said sheet encompassed within all of said first lines being defined as a base, those portions of said sheet each bordering said base and encompassed within said first lines and one of said outer edges being defined as sidewalls, and those portions of said sheet in the regions of said corners each encompassed within said first lines and two adjacent ones of said outer edges being defined as corner members.

As embodied herein, with continuing reference to FIG. 2, a plurality of first lines 32 and 34 are suitably formed in the sheet 24, as by scoring, such that they extend, respectively, across the sheet between the edges 28 and 26. The first lines 32 and 34 are parallel with their corresponding outer edges 26 and 28, which is to say that they lie at a substantially constant distance inboard from their corresponding outer edges. Base 36 is that portion of the sheet 24 which is encompassed within all of the first lines 32 and 34. In a similar manner, those portions of the sheet 24 which, respectively, border the base 36 and are encompassed within portions of the first lines 34 or 32 and a corresponding one of the outer edges 26 or 28 are referred to, respectively, as sidewalls 38 and 40. Finally, those portions of the sheet 24 in the regions of the corners 30 which are encompassed within portions of the first lines 32 and 34 and also by portions of the adjacent outer edges 26 and 28 are defined as corner members 42.

In accordance with the invention, second lines are formed in said sheet diagonally across said corner members extending from the intersection of each of said associated first lines to its associated said corner lying in the perimeter of said sheet. As embodied herein, with continuing reference to FIG. 2, second lines 44 are suitably formed in the sheet 24, as by scoring, such that they extend diagonally across each corner member 42 from the intersection of each of the associated first lines 32 and 34 to its associated corner 30 which lies in the perimeter of the sheet.

In accordance with the invention, each of said sidewalls has an inner surface and an outer surface and is foldable along its said associated first line between a first position substantially coplanar with said base through a second position lying in a plane transverse to the plane of said base, adjacent ones of said sidewalls lying in mutually intersecting planes when they assume the second position to a third position lying in a plane parallel to and contiguous with a plane of said base; each of said corner members being foldable along said associated first and second lines into a contiguous relationship with said outer surface of an adjacent one of said sidewalls when said sidewalls assume their second positions.

As embodied herein, with particular reference now to FIGS. 1–6, each of the sidewalls 38 has an inner surface 46 and an outer surface 48 (see FIG. 1). Similarly, each of the sidewalls 40 has an inner surface 50 and an outer surface 52 (see FIG. 1). Each of the sidewalls 38 and 40 is foldable along its associated first line, 32 and 34, respectively, between a first position substantially coplanar with the base 36 (see FIG. 2) through a second position lying in a plane transverse to the plane of the base 36 such that adjacent sidewalls 38 and 40 lie in mutually intersecting planes (see FIG. 1), to a third position lying in a plane parallel to and contiguous with the plane of the base 36 (see FIG. 3).

It will be appreciated that in the process of erecting the sidewalls 38 and 40, each of the corner members is simultaneously operated upon. Specifically, viewing FIGS. 4–6, each corner member 42 is folded along its associated second line 44 as well as along its associated portions of the first lines 32 and 34 from the flattened position illustrated in FIG. 4 through the intermediate position illustrated in FIG. 5 to its completed position illustrated in FIG. 6 at which point the corner member 42 assumes a contiguous relationship with the outer surface of its adjacent sidewall. In the instance illustrated in FIG. 6, for example, the corner member 42 assumes a contiguous relationship with the outer surface 48 of its adjacent sidewall 38.

In accordance with the invention, the receptacle also comprises retention means engageable with each of said corner members and an inner surface of each said associated sidewall for releasably holding each of said corner members in a contiguous relationship against its associated said outer surface when said sidewalls assume their second positions, thereby maintaining said sidewalls in their second positions, whereby said base, said sidewalls, and said corner members all together define a liquid tight vessel.

Figure 8:
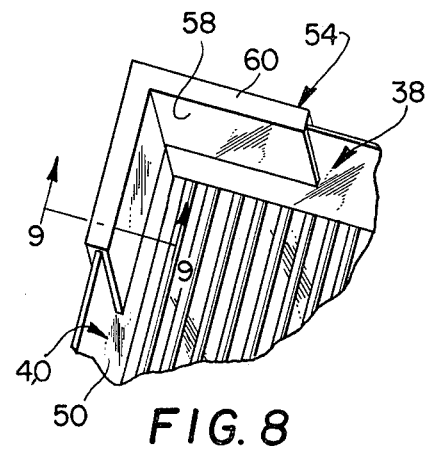
FIG. 8 is a perspective view of the invention similar to FIGS. 4-7 and illustrating a final step in the process of erecting the invention for use.
Figure 9:
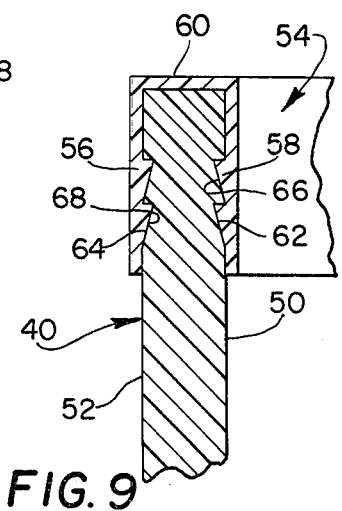
FIG. 9 is a cross section view taken generally along line 9—9 in FIG. 8.

As embodied herein, with particular reference to FIGS. 7–9, a retention member, generally indicated by reference numeral 54, is illustrated first as it is in the process of being applied to the receptacle 20 when the sidewalls 38 and 40 and the corner members 42 assume the erect position illustrated in FIG. 6. It will be appreciated from viewing FIGS. 7 and 8 that at least a portion of the retention member 54 engages each of the corner members 42 as well as the inner surface of its associated sidewall and thereby releasably holds each of the corner members in a contiguous relationship against its associated outer surface of a sidewall when they assume the second or erect positions. In this condition, with the sidewalls and corner members erect, those elements together with the base 36 all together define a liquid tight vessel, namely, the receptacle 20.

In accordance with the invention, the retention means more specifically includes a fastener having first and second legs and a u-shaped bight connecting said first and second legs, said bight biasing said first and second legs toward one another, said fastener means being selectively receivable over said sidewalls and said associated corner members when said sidewalls assume their second positions such that said first leg engages said inner surface and said second leg engages said corner member and holds it in a contiguous relationship against said outer surface.

As embodied herein, with continuing reference to FIGS. 7–9, the retention member or fastener 54 includes a first leg 56 and a second leg 58 connected by a u-shaped bight 60 (see especially FIG. 9). The fastener 54 is fabricated in any suitable manner such that the bight 60 serves to bias the legs 56 and 58 toward one another. With such a construction, the retention member or fastener 54 more firmly engages the sidewalls and the corner members to hold them in their erect positions. While the fastener 54 is illustrated in FIGS. 7 and 8 as being angular such that one portion engages the sidewall 38 and corner member 42 and the other portion engages the sidewall 40, it will be appreciated that it is within the scope of the invention for the fastener 54 to include only that portion engageable with the sidewall 38 and corner member 42.

In accordance with the invention, the receptacle is generally as previously described wherein said inner and outer surfaces are roughened and wherein mutually facing surfaces of said first and second legs are similarly roughened such that said respective roughened surfaces are mutually engageable when said retention means is received in fitting relationship with its associated said sidewalls.

As embodied herein, with particular reference to FIGS. 4–10, the sidewalls 38 and 40 are preferably formed with roughened surfaces 62 and 64 on their inner and outer surfaces, respectively. The mutually facing surfaces of the legs 58 and 56 of the retention member or fastener 54 are similarly roughened as at 66 and 68, respectively. It will be appreciated that the roughened surfaces 62, 64, 66, and 68 can take any suitable form which will serve the purpose of maintaining the retention member 54 in engagement with its associated sidewall and corner member. For example, the roughened surfaces may have the consistency of sandpaper, or they may be of a sawtooth design as illustrated in the drawings.

In accordance with the invention, the receptacle 20 is generally as previously described including strap means mounted on said sidewalls and extending beyond and transverse to said edges for suspending said receptacle beneath the engine, and more specifically, wherein said strap means includes a plurality of straps integral with said sidewalls and includes a free end for releasable attachment to the engine supporting structure. As embodied herein, with particular reference now to FIGS. 1, 11, and 12, the receptacle 20 includes straps 70 which may be suitably attached to their associated sidewalls by means of rivets 72 or other suitable fastening means (see FIG. 1). In an alternative construction straps 70a be made integral with the sidewalls as illustrated in FIGS. 2 and 3. In either event, however, each strap (70 or 70a) includes a free end for releasable attachment to engine supporting structure schematically indicated by reference numeral 74.

In accordance with the invention, the receptacle 20 is generally as previously described wherein said base includes strengthening means for increasing its rigidity and, more specifically, wherein said strengthening means includes a plurality of parallel ribs formed on a surface of said base. As embodied herein, with particular reference to FIGS. 2 and 13, the base 36 is illustrated as formed with strengtheners in the form of ribs 76. However, it will be appreciated that the base 36 may be of any other suitable construction which would serve to strengthen it and still enable it to be readily suspended over relatively long distances. Specifically, it is within the scope of the invention that the base 36 be of a corrugated construction or be formed such that the thickness of the base 36 is greater than that of the sidewalls 38 and 40 and of the corner members 42.

In accordance with the invention, the receptacle 20 is generally as previously described but modified to the extent wherein said retention means includes a fastener integral with said sidewall in the region of a corner having a leg extending toward said associated first line and a u-shaped bight extending between said leg and said associated edge, said bight biasing said leg towards its associated outer surface, said leg adapted to receive said associated corner member between itself and said associated outer surface.

Figure 14:
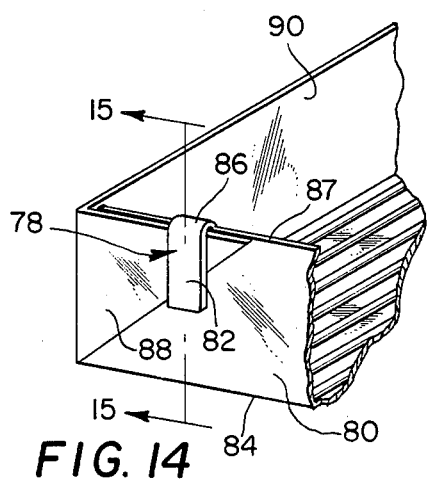
FIG. 14 is a detail perspective view of a modified embodiment of the invention.
Figure 15:
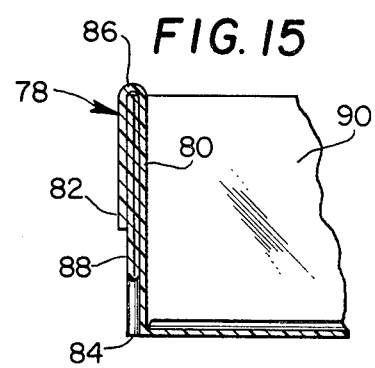
FIG. 15 is a cross section view taken generally along line 15—15 in FIG. 14.

As embodied herein, with particular reference now to FIGS. 14 and 15, a retention member in the form of a fastener 78 is integral with a sidewall 80 of a modified receptacle. In this embodiment, the fastener 78 is located in the region of a corner of the receptacle and includes a leg 82 which extends toward an associated first line 84 about which the sidewall 80 can be folded.

The fastener 78 also includes a u-shaped bight 86 which extends between the leg 82 and an outer edge 87 of the sidewall 80, the fastener 78 being formed in any suitable manner such that the bight serves to bias the leg 82 toward an outer surface of the sidewall 80. As illustrated in FIGS. 14 and 15, with the sidewalls in their erected positions, a corner member 88 which may be substantially similar to the corner member 42 (FIG. 2) may be slid between an outer surface of the sidewall 80 and an inner surface of the leg 82 (FIG. 14). In this condition, the fastener 78 serves to firmly hold the corner member 88 in a contiguous relationship with the outer surface of the sidewall 80 and assures that the sidewall 80 and an adjacent sidewall 90 will remain in their erected positions.

In accordance with the invetion, the receptacle is generally as previously described but modified to the extent that each said sidewall and its associated said corner member have mutually communicating apertures therethrough when said corner members assume a contiguous relationship with said outer surface of an adjacent one of said sidewalls when said sidewalls assume their second positions and wherein said retention means includes a fastener inclcuding a head engageable with said corner member and an integral shank extending through the apertures and beyond said inner surface, and a female member fittingly received over an end of said shank and engageable with said inner surface.

Figure 16:
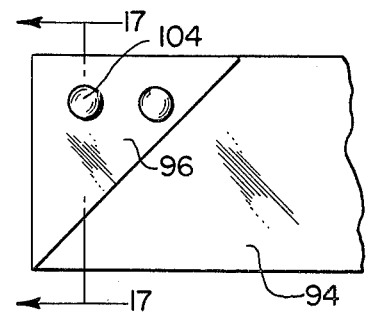
FIG. 16 is a detail side elevation view illustrating still another embodiment of the present invention.
Figure 17:
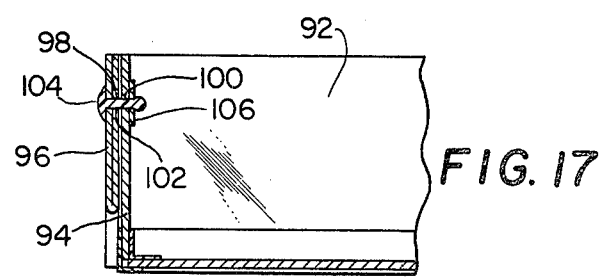
FIG. 17 is a cross section view taken generally along line 17—17 in FIG. 16.

As embodied herein, with particular reference now to FIGS. 16 and 17, adjacent sidewalls 92 and 94 of a modified receptacle are illustrated in their erected positions. Also, a corner member 96, generally similar to the corner member 42 (FIG. 2) is shown as it assumes a contiguous relationship with an outer surface of the sidewall 94 in its erected position. With the corner member 96 and the sidewall 94 thus mutually positioned, apertures 98 and 100, respectively, formed in those elements are in a communicative relationship such that a shank 102 of a rivet having a head 104 extends through the apertures and beyond an inner surface of the sidewall 94, the head 104 being engageable with the corner member 96. Thereupon, a female member 106 can be fittingly received over the free end of the shank 102 and is engageable with the inner surface of the sidewall 94. One or more such rivets can be utilized and serve to hold the adjacent sidewalls 92 and 94 in their erect positions as well as the corner member 96 in position against the outer surface of the sidewall 94.

Figure 19:
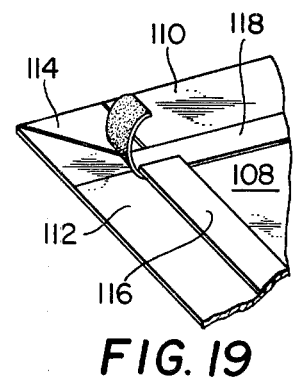
FIG. 19 is a detail perspective view of a portion of the embodiment illustrated in FIG. 18.
Figure 18:
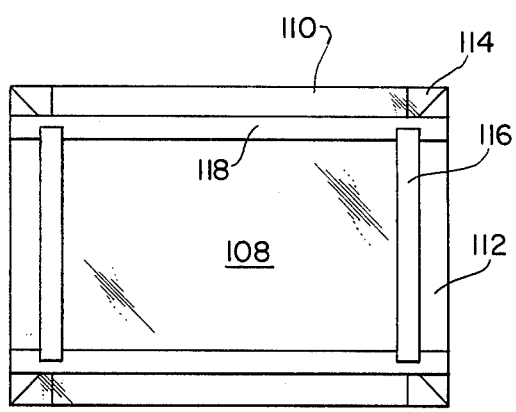
FIG. 18 is a top plan view, similar to FIG. 2, illustrating yet another embodiment of the invention.

It is also within the purview of the present invention to provide a construction as illustrated in FIGS. 18 and 19. Specifically, this modified embodiment includes a base 108, sidewalls 110 and 112, and corner members 114 which are all fabricated as individual pieces of sheet material. The individual pieces representing these elements are then attached in a contiguous relationship in a suitable manner, for example, by means of pressure sensitive tape indicated by reference numerals 116 and 118. Of course, as with the receptacle 20, the materials employed for the base, sidewalls and corner members as well as for the pressure sensitive tape must be such that the resulting receptacle is liquid tight. In all other respects, the resulting receptacle would be expected to conform to the teachings provided above.

Another possible construction of the receptacle might take the form of a base and separate sidewalls with the sidewalls being subsequently joined to the base by means of a liquid plastic material which would harden into pliable hinges defined by the first and second lines and resulting in substantially the structure described and illustrated with reference to FIGS. 1–3.

To put the invention to use, the receptacle 20 in the form as represented in FIG. 2, is operated upon until it assumes the form illustrated in FIG. 3. Specifically, the sidewalls 38 are folded about their associated lines 32 and the sidewalls 40 are folded about their associated lines 34 until the sidewalls 38 and 40 lie in planes which are parallel to and contiguous with the plane of the base 36. In this condition, then, the receptacle 20, is slid beneath the underside of the engine 22 and between the engine supporting structure 74 (see FIG. 11) until it assumes its final position as generally indicated in FIG. 12. Thereupon, the free ends of the supporting straps 70 (or 70a, as the case may be) are mounted in any suitable fashion to the engine supporting structure 74 such that the receptacle 20 is suspended beneath the engine 22 and covers an area greater than a top plan projection of the engine 22. When so positioned, the receptacle is effective to collect oil and other liquids which drip from the underside of the engine. From time to time, the drippings collected by the receptacle may be suitably removed.

The invention, in its broader aspects, is not limited to the specific details shown and described; departures may be made from such details without departing from the principles of the invention and without sacrificing its chief advantages.

What is claimed is:

1. A receptacle for collecting waste material in the form of oil and other liquids which drip from the underside of an engine comprising:
    a sheet of semirigid plastic material in the form of a polygon having a plurality of outer edges defining its perimeter and a plurality of corners defining the limits of said outer edges, said sheet lying in a substantially flat plane, said sheet being impervious to the passage of liquids;
    first lines formed in said sheet extending from one of said edges to another of said edges at a substantially constant distance inboard from each edge of said sheet, those portions of said sheet encompassed within all of said first lines being defined as a base, those portions of said sheet each bordering said base and encompassed within said first lines and one of said outer edges being defined as sidewalls, and those portions of said sheet in the regions of said corners each encompassed within said first lines and two adjacent ones of said outer edges being defined as corner members;
    said base including a plurality of parallel spaced ribs formed on its surface for increasing its rigidity;
    second lines formed in said sheet diagonally across said corner members extending from the intersection of each of said associated first lines to its associated said corner lying in the perimeter of said sheet;
    each of said sidewalls having an inner surface and an outer surface and being foldable along its said associated first line between a first position substantially coplanar with said base through a second position lying in a plane transverse to the plane of said base, adjacent ones of said sidewalls lying in mutually intersecting planes when they assume the second position to a third position lying in a plane parallel to and contiguous with a plane of said base;
    each of said corner members being foldable along said associated first and second lines into a contiguous relationship with said outer surface of an adjacent one of said sidewalls when said sidewalls assume their second positions;
    retention means engageable with each of said corner members and an inner surface of each said associated sidewall for releasably holding each of said corner members in a contiguous relationship against its associated said outer surface when said sidewalls assume their second positions, thereby maintaining said sidewalls in their second positions, whereby said base, said sidewalls, and said corner members all together define a liquid tight vessel, said retention means including a fastener having first and second legs and a u-shaped bight connecting said first and second legs, said bight biasing said first and second legs toward one another, said fastener being selectively receivable over said sidewalls and said associated corner members when said sidewalls assume their second positions such that said first leg engages said inner surface and said second leg engages said corner member and holds it in a contiguous relationship against said outer surface, said inner and outer surfaces being roughened so as to have a sawtooth cross-section having successive troughs and ridges extending in a direction generally transverse to the direction of movement of said fastener as it is being applied to said corner members and said associated sidewall and wherein mutually facing surfaces of said first and second legs are similarly roughened such that said respective roughened surfaces are mutually engageable when said fastener is received in fitting relationship with its associated said sidewalls; and
    a plurality of straps mounted on said sidewalls at spaced locations and extending beyond and transverse to said edges for suspending said receptacle beneath the engine.

2. A receptacle as set forth in claim 1 wherein said sheet is in the form of a rectangle.

* * * * *